United States Patent [19]
Malek et al.

[11] Patent Number: 5,809,540
[45] Date of Patent: Sep. 15, 1998

[54] PROCESSOR COMMAND FOR PROMPTING A STORAGE CONTROLLER TO WRITE A DAY CLOCK VALUE TO SPECIFIED MEMORY LOCATION

[75] Inventors: Robert M. Malek, White Bear Lake; David P. Williams, Mounds View; Stephen Sutter, Osseo, all of Minn.

[73] Assignee: Unisys Corporation, Blue Bell, Pa.

[21] Appl. No.: 577,909

[22] Filed: Dec. 4, 1995

[51] Int. Cl.[6] .................................................. G07C 1/00
[52] U.S. Cl. ........................ 711/154; 364/145; 395/551
[58] Field of Search ............................ 395/183.21, 299, 395/551; 364/145; 711/154; 360/6

[56] References Cited

U.S. PATENT DOCUMENTS

| | | | |
|---|---|---|---|
| 4,122,498 | 10/1978 | Dyer | 360/6 |
| 4,349,890 | 9/1982 | Chang | 395/551 |
| 4,590,550 | 5/1986 | Eilert et al. | 395/183.2 I |
| 4,708,491 | 11/1987 | Luitje | 368/156 |
| 4,764,863 | 8/1988 | Silverthorn, III et al. | 395/183.15 |
| 5,146,585 | 9/1992 | Smith, III | 395/551 |
| 5,255,182 | 10/1993 | Adams | 395/217 |
| 5,265,240 | 11/1993 | Galbraith et al. | 395/835 |
| 5,270,475 | 12/1993 | Weiss et al. | 84/603 |
| 5,327,468 | 7/1994 | Edblad et al. | 375/356 |
| 5,355,161 | 10/1994 | Bird et al. | 348/2 |

*Primary Examiner*—Tod R. Swann
*Assistant Examiner*—J. Peikari
*Attorney, Agent, or Firm*—Nawrocki, Rooney & Sivertson, P.A.

[57] ABSTRACT

A method and apparatus for efficiently reading a day clock and storing the value into main storage. An advantage is that the memory storage command can request the main storage control to read a current day clock value and store the value into a main storage location specified by the requesting processor while allowing the requesting processor to continue processing other commands. A further advantage is that the requesting processor does not have to wait for the return of a day clock value or the generation of a main storage write request which may reduce the number of main storage I/O bus requests and bus transfer cycles over that normally required to transfer the day clock value to the requesting processor and then back to main storage.

16 Claims, 6 Drawing Sheets

| 0 | 1 | 2 | 3 | 4 | 5 | 6 | FUNCTION |
|---|---|---|---|---|---|---|---|
| 0 | 0 | 0 | X | X | X | X | CONTROL READS |
| 0 | | | 0 | 0 | 0 | 0 | READ DAYCLOCK |
| 0 | | | 0 | 0 | 0 | 1 | READ DAYCLOCK COMPARATOR |
| 0 | | | 0 | 0 | 1 | 0 | WRITE DAYCLOCK TO MAIN MEMORY |
| 0 | | | 0 | 0 | 1 | 1 | NOT USED |
| 0 | | | 0 | 1 | 0 | 0 | OCACHE READ TWO WORDS |
| 0 | | | 0 | 1 | 0 | 1 | NOP READ WITH LOCK |
| 0 | | | 0 | 1 | 1 | 0 | NOT USED |
| 0 | | | 0 | 1 | 1 | 1 | NOT USED |
| 0 | | | 1 | 0 | 0 | 0 | I/O READ TWO WORDS |
| 0 | | | 1 | 0 | 0 | 1 | I/O READ FOUR WORDS |
| 0 | | | 1 | 0 | 1 | 0 | I/O READ ONE WORD WITH LOCK |
| 0 | | | 1 | 0 | 1 | 1 | NOT USED |
| 0 | | | 1 | 1 | 0 | 0 | RESERVED (SC INTERNAL FLASH 8 WORDS) |
| 0 | | | 1 | 1 | 0 | 1 | NOT USED |
| 0 | | | 1 | 1 | 1 | 0 | NOT USED |
| 0 | | | 1 | 1 | 1 | 1 | NOT USED |

PROCESSOR COMMAND FOR PROMPTING A STORAGE CONTROLLER TO WRITE A DAY CLOCK VALUE TO SPECIFIED MEMORY LOCATION

CROSS REFERENCE TO CO-PENDING APPLICATIONS

The present application is related to U.S. patent application Ser. No. 07/912,972, filed Jul. 10, 1992, entitled "Dayclock Carry and Compare Tree", which is assigned to the assignee of the present invention and is incorporated herein by reference.

BACKGROUND OF THE INVENTION

1. Field of the Invention

The present invention generally relates to a digital data processing system having a day clock to maintain system time. More particularly it relates to a memory storage command that requests the main storage control to read a day clock and store the day clock value into a main storage location specified by the requesting processor.

2. Description of the Prior Art

A key element of general purpose digital data processing systems is the necessity to maintain time. Typical prior art systems have used real time clocks to determine relative time. However, in applications such as those requiring large systems to keep track of a large number of users, it is necessary to use a time of day clock. The time of day clock provides a measure of absolute time suitable for indication of the current date and time.

It is often desirable and frequently necessary to transfer the time of day clock value to a main storage location to timestamp the occurrence of a particular event. Prior art systems must transfer the current time of day clock value to a requesting processor where the requesting processor subsequently transfers the value to a main storage location. The time required for a requesting processor to record the current day clock value into a main storage location is time however not spent performing other system processing activities. An efficient means is thus necessary to record the current day clock value so that the requesting processor and the data processing system can achieve the highest possible level of performance.

One problem is that prior art designs requiring a time of day clock have not emphasized the use of a write-day clock-to-memory command. Prior art designs have also not emphasized utilizing a storage controller fetch a current day clock value and store the result in a predetermined memory location in response to a write-day clock-to-memory command. U.S. Pat. No. 4,764,863, issued to Silverthorn, III et al., suggests monitoring transactions on a high speed interface bus using electronic hardware and selectively storing information about such transactions together with the time of such transactions. Silverthorn, III et al. suggests use of a transaction analyzer on a high-speed interface bus to monitor interactions on the bus, identify key interactions, and select appropriate interactions at key points. Silverthorn, III et al. also suggest each sample captured from the bus include a high-resolution time stamp to preserve timing relationships. However the time stamp is attached before storing the resulting word to memory. This therefore does not reduce the number of main storage I/O bus requests and bus transfer cycles over that normally required to transfer the day clock value to the requesting processor and then back to main storage. Silverthorn, III et al. thus does not take advantage of a write-day clock-to-memory command.

Another means for recording a current time of day clock value for a digital data processing system is to measure and log the terminal elapsed time for each message requesting authorization of a transaction that a terminal attempts to transmit. U.S. Pat. No. 5,255,182 issued to Adams, provides for monitoring the quality of a transaction authorization network by monitoring and measuring the elapsed time from the authorizing terminal. The terminal elapsed time for a message requesting an authorization is the time required for the terminal to receive a message in response to the message requesting authorization. This is the time elapsed between the origination time and the received time. The origination time is the time at which the point-of-sale terminal begins to establish communication with the computer to which it is connected, and the received time is the time at which the terminal receives the returned message back from the computer. Thus, by recording the day clock value to measure the origination time and receive time, the total time required for the transaction network to authorize the transaction entered from the point-of-sale terminal can be determined. The method of logging the origination time of a message and having each computer in the network add a time stamp to the message as the message returns from the computer to the terminal does not reduce the number of main storage I/O bus requests and bus transfer cycles required to transfer the day clock value to memory, and is thus not an efficient method for reading and storing the value of the day clock.

Another approach is to use the current day clock value to measure the busy utilization time of an I/O channel within a computer processing system. U.S. Pat. No. 5,265,240 issued to Galbraith et al., suggests measuring the utilization time by using a channel processor to store a time stamp value for each partition or measurement. This is done by controlling the measurement by issuing "set channel measurement" instructions for starting and stopping the measurement performed by the channel processor. This approach releases the CPU controlling the measurement for other independent operations during the measurement period. However, in using this approach to correlate busy time for each respective partition with the time interval in which the busy activity occurred, Galbraith et al. does not suggest having a storage controller fetch the day clock value and store the result in a predetermined memory location in response to a request to write the day clock value to memory. Although this approach releases the CPU for other independent CPU operations during the measurement period, a channel processor must store a "time stamp" value for each partition if that partition had activity during the timed interval. Thus additional storage I/O bus requests and bus transfer cycles are required to transfer the current day clock value to memory.

An alternative approach to store a current time of day clock value into memory is to time stamp received data in local memory in an identification system for broadcast program segments. The time stamp received data corresponds with the time and date the encoded program segment was received. U.S. Pat. No. 5,355,161, issued to Bird et al., suggests an identification system for broadcast program segments. When the time stamp data is retrieved from local memory, the retrieved times can be used to confirm the precise broadcast time for each time stamped program segment. This approach however does not request a main storage controller to read a current day clock value and store that value into a main storage location specified by the requesting processor. This approach also does not reduce the number of main storage I/O bus requests and bus transfer cycles necessary to store the day clock value into main storage. Although the prior art does show a variety of approaches to record the current day clock value into memory storage, these approaches do not emphasize an efficient means of storing the day clock value by utilizing the main storage control to read the current day clock value and store the value into a main storage location specified by the requesting processor. The prior art approaches do not allow the requesting processor to continue processing other commands while the current day clock value is being retrieved and stored, and further, do not reduce the number of main storage I/O bus requests or bus transfer cycles over that normally required to transfer the day clock value to the requesting processor then back to main storage. Thus a more efficient approach is necessary for applications requiring an absolute time of day clock measurement that will allow the requesting processor to continue processing other commands while the main storage control is storing the current value of the day clock into a main storage location. This would improve the system operating efficiency by reducing the number of main storage I/O bus requests and bus transfer cycles necessary to store the current value of the day clock into a main storage location.

SUMMARY OF THE INVENTION

The present invention overcomes many of the disadvantages of the prior art by providing a method for efficiently storing a current day clock value into a main storage location specified by the requesting processor.

In the preferred mode, not to be deemed limiting of the present invention, the following factors contribute to the efficient reading and storage of the current day clock value into a main storage location. First of all, the main storage command requests that the main storage controller read the day clock and store the value into a main storage location specified by the requesting processor while releasing the requesting processor to process other activities without the need to wait for the return of the day clock value or the generation of a main storage write request. Since the requesting processor can continue processing other activities, the result is a more efficient processing system as the number of main storage I/O bus requests and bus transfer cycles is reduced.

Unlike the prior art day clock methods, the preferred mode of the present invention can request a main storage control to read the current day clock value and store the value into a main storage location specified by the requesting processor. Thus, in the preferred mode, the day clock is coupled to the storage controller to be stored directly to a main storage location specified by the requesting processor. The write-day clock-to-memory command contains a function code and an address along with other address fields. The function code determines the transaction type supported by the I/O bus which includes reading the current day clock value and writing the day clock value into main memory storage. The location within main memory storage that the current day clock value is written to is contained within the address field of the instruction word for the write-day clock-to-a-memory command.

The key improvement over the prior art is the ability to read and store a day clock value in a main storage location on the basis of a single memory storage command. This is due to the day clock being coupled directly to the main storage control thus allowing the main storage control to read the current day clock value and directly transfer that value into a main storage location specified by the address field of the write-day clock-to-memory command.

Thus, as can be readily seen, the improvement of the present invention overcomes the limitations of prior art designs which do not allow the main storage control to read a current day clock value and store that value directly into a main storage location specified by the requesting processor on the basis of a single command. This advantage of the present invention of using a single command to read the current day clock value and store that value into a main storage location allows for more efficient data processing as the requesting processor could continue to process other commands rather than wait for the return of the day clock value or the generation of a main storage write request. A benefit thus is the reduction of the number of main storage I/O bus requests and bus transfer cycles over that normally required to transfer the day clock value to the requesting processor and then back to main storage.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
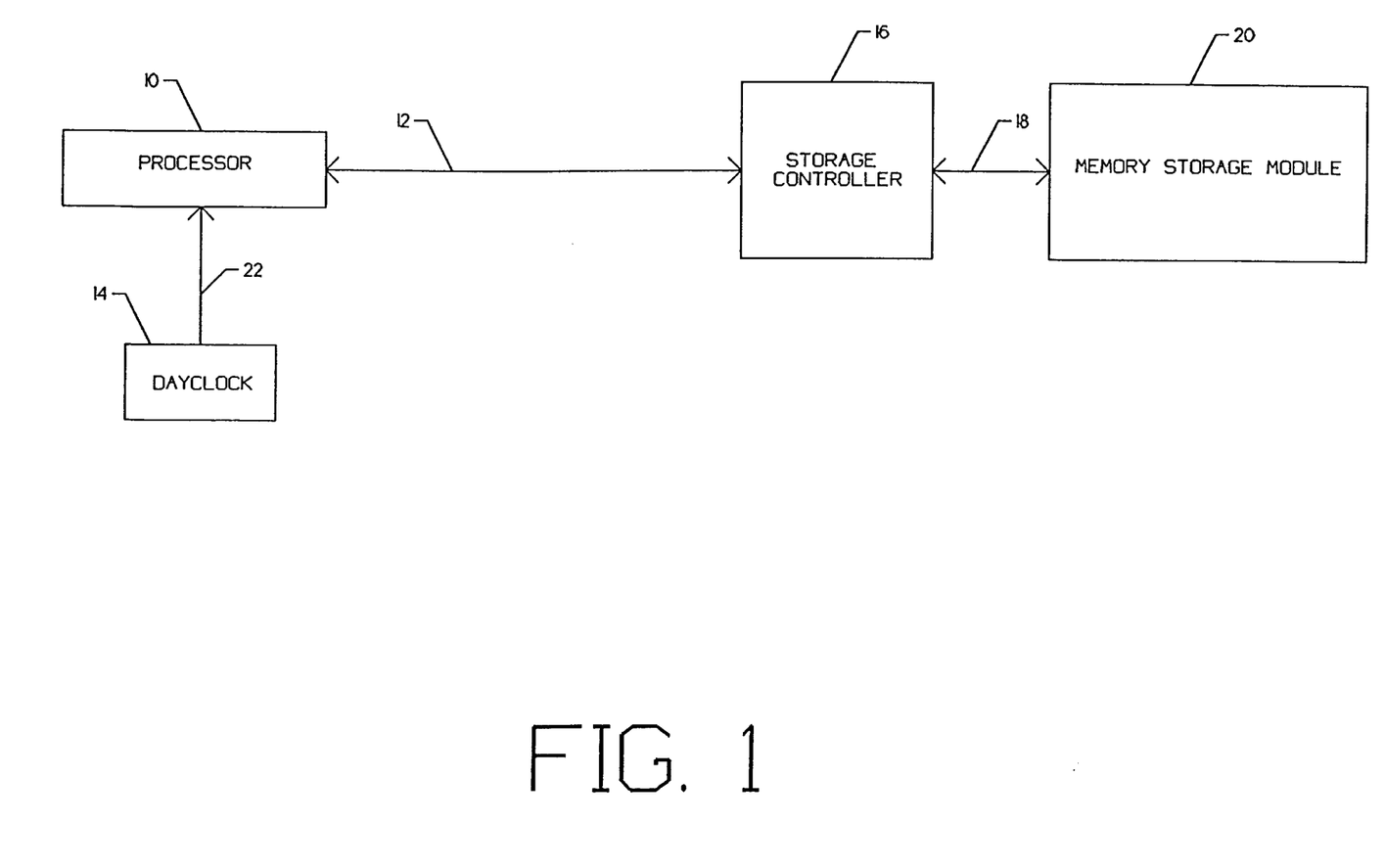
FIG. 1 is a block diagram showing an alternate mode of the present invention.

FIG. 1 is a block diagram showing an alternate mode of the present invention. Day clock 14 couples to processor 10 through path 22. Processor 10 communicates to storage controller 16 through memory bus 12. Storage controller 16 communicates to memory storage module 20 through bus 18. In the alternate mode, processor 10 requests storage controller 16 to read day clock 14 through processor 10, and store the value into a storage location within memory storage module 20. Thus the processor 10 forwards a write-day clock-to-memory command using an instruction word format which contains a function code and an address field. Storage controller 16, on the basis of the function code, reads day clock 14 through processor 10 and stores the value of day clock 14 into memory storage module 20 to the address specified by the address field of the instruction word.

Figure 2:
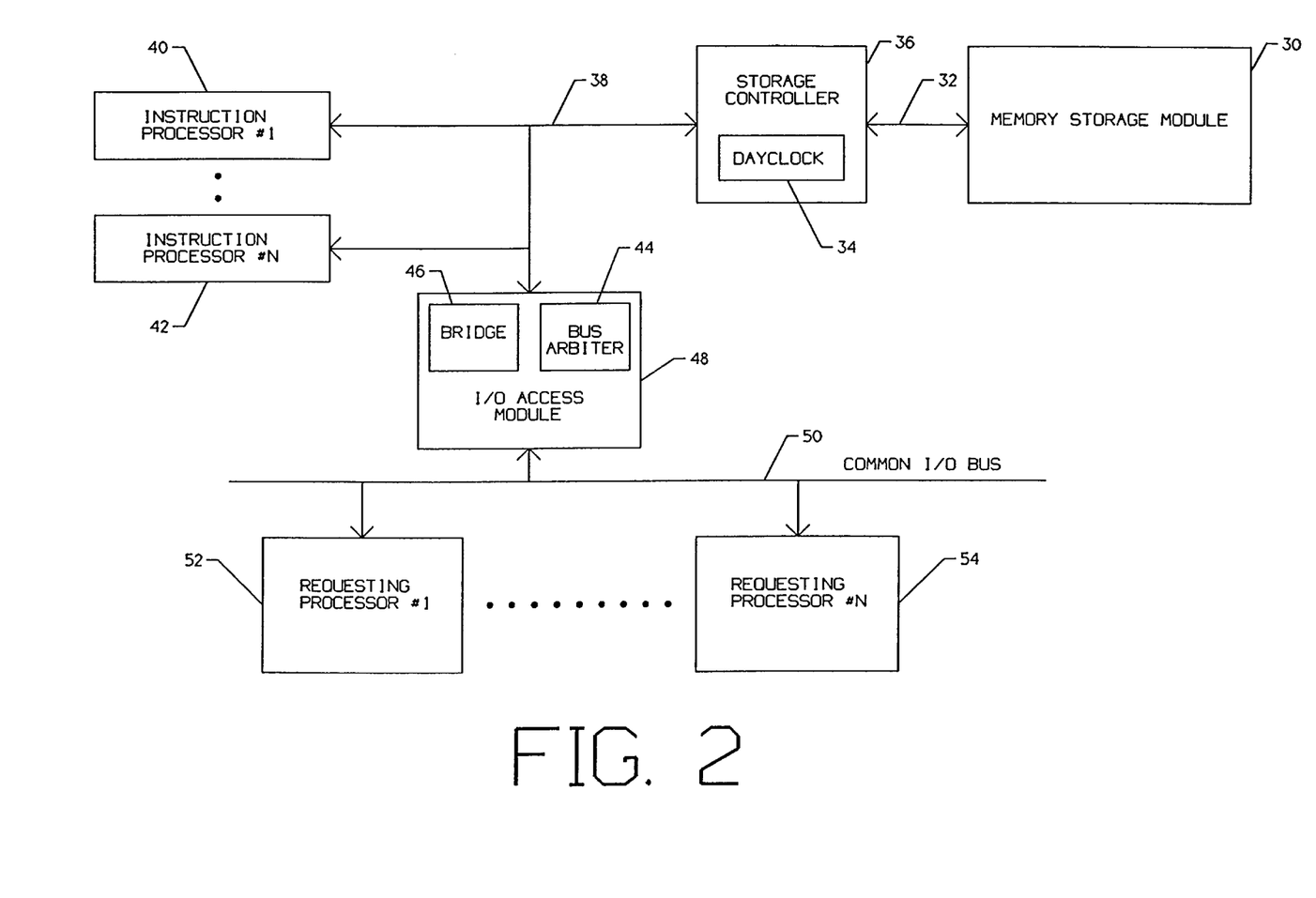
FIG. 2 is a block diagram showing the preferred mode of the present invention.

FIG. 2 is a block diagram showing the preferred mode of the present invention. Memory storage module 30 couples to storage controller 36 through bus 32. Storage controller 36 couples to day clock 34, and also couples to memory bus 38. Memory bus 38 couples to a plurality of instruction processors. The instruction processors are shown in FIG. 2 as instruction processor number #1 40 through instruction processor #N 42. I/O access module 48 is also coupled to memory bus 38. I/O access module 48 contains bus arbiter 44 and bridge 46. I/O access module 48 couples to a plurality of requesting processors through common I/O bus 50. The plurality of requesting processors is shown as requesting processor number #1 52 through requesting processor number #N 54. Within I/O access module 48, bus arbiter 44 controls access to memory bus 38 from the plurality of requesting processors coupled to common I/O bus 50. Bridge 46 of I/O axis module 48 links common I/O bus 50 to memory bus 38 and acts as a node on both busses.

In the preferred mode, one of the plurality of requesting processors shown by requesting processor number #1 52 through requesting processor number #N 54 requests the storage controller 36 to read day clock 34 and store the value into a storage location within memory storage module 30. Thus, a processor such as requesting processor number #1 52 forwards a write day clock to memory command using an instruction word format which contains a function code and an address field. Storage controller 36, on the basis of the function code, reads day clock 34 and stores the value of day clock 34 through bus 32 into memory storage module 30 to the address specified by the address field of the instruction word.

Figure 3:
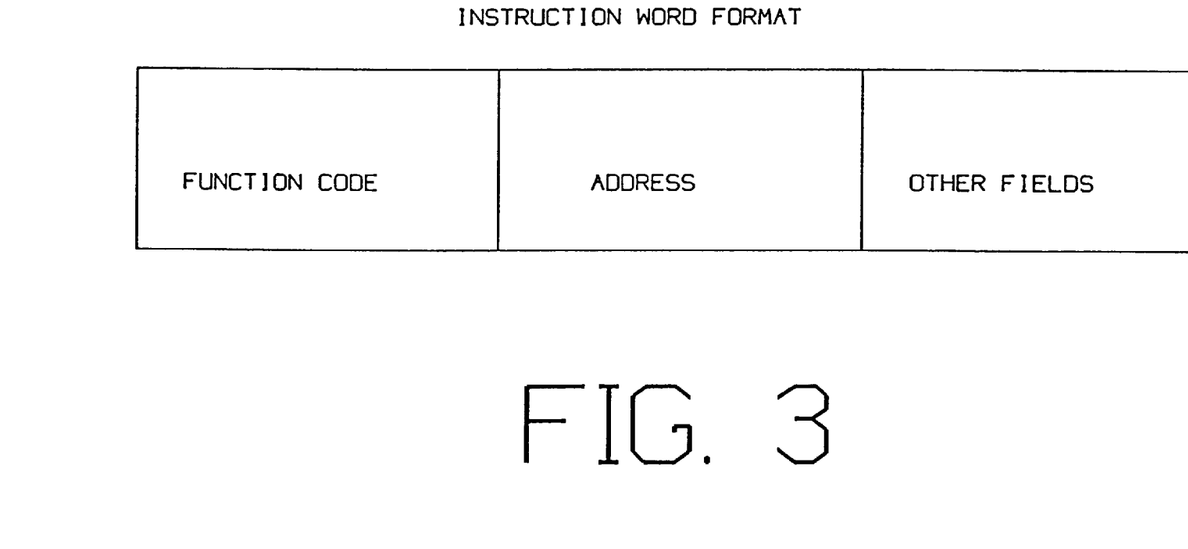
FIG. 3 is the instruction word format for the write day clock to memory command.

FIG. 3 is the instruction word format for the write day clock to memory command. The instruction word format contains a function code, an address, and other fields. The function code directs the storage controller 36 to read day clock 34 and write the current value of day clock 34 into memory storage module 30 through bus 32. The instruction word format also contains an address. This address specifies the address within memory storage module 30 where storage controller 36 stores the current value of day clock 34.

Figure 4:
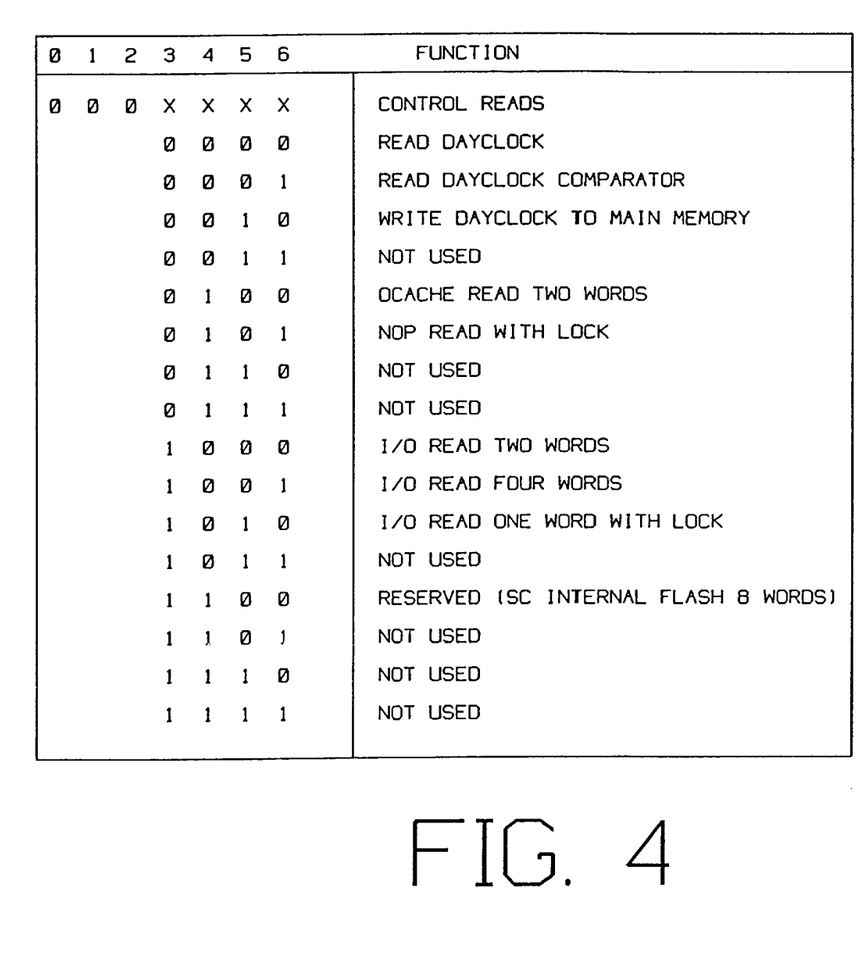
FIG. 4 is the detailed function code assignments for the function code field for the write-day clock-to-memory command.

FIG. 4 is a detailed function code assignment for the function code field for the write day clock to memory command. The function code assignment shows the read functions which direct storage controller 36 to write the current value of day clock 34 into memory storage module 30 through bus 32. The detailed function code assignment is the function code of the instruction word format as depicted in FIG. 3. This shows the many transaction types supported by a typical data processing system shown generally in FIG. 2, and shows specifically the format for the write day clock to main memory command.

Figure 5:
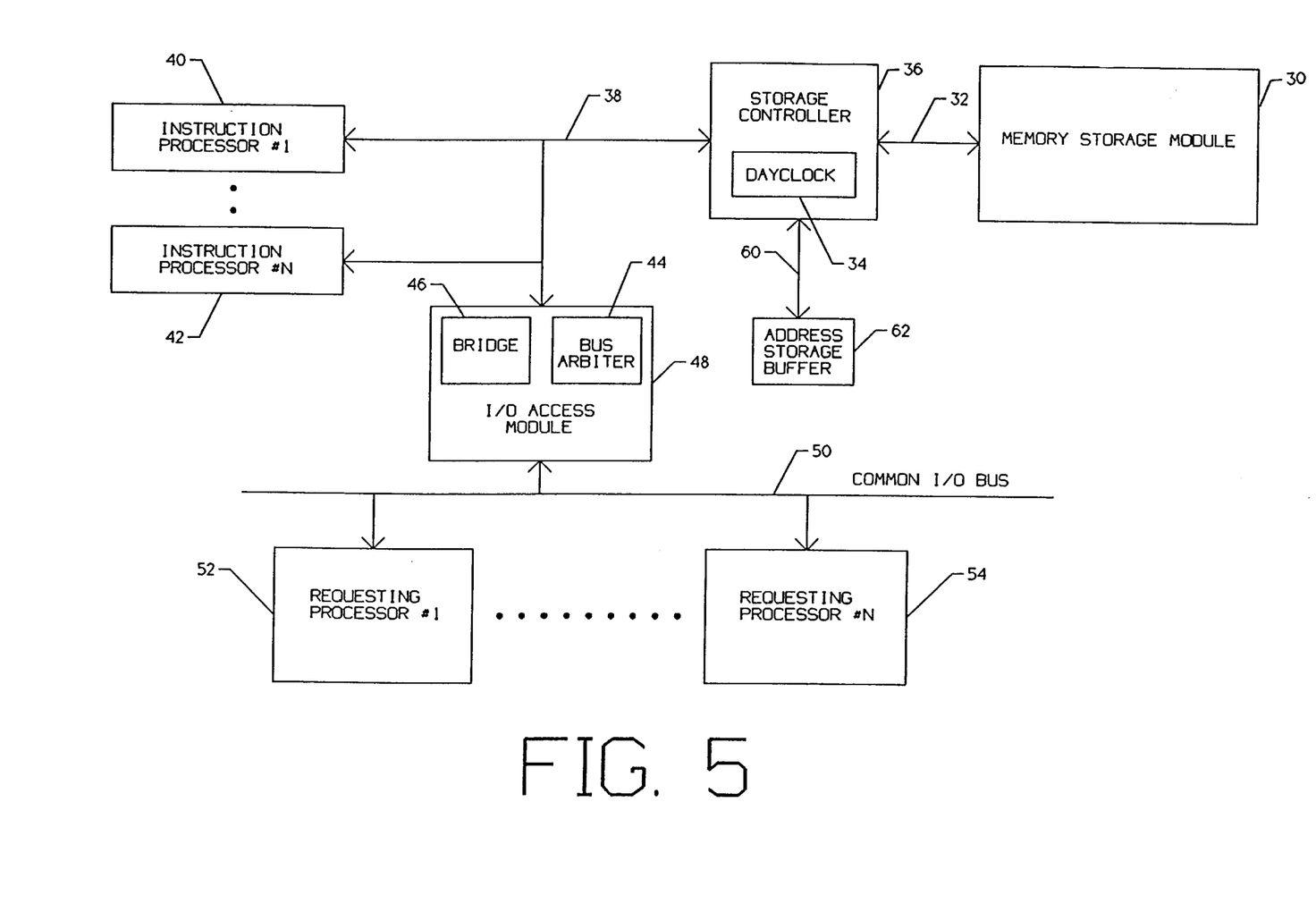
FIG. 5 is a block diagram showing an alternate mode of the present invention.

FIG. 5 is a block diagram showing an alternate mode of the present invention. The method for storage controller 36 to write the current value of day clock 34 into memory storage module 30 through bus 32 is generally the same as shown in FIG. 2 with the exception of the limitations described herein. In the alternate mode, address storage buffer 62 is coupled to storage controller 36 through interface 60. The instruction word format for the write day clock to memory command as shown in FIG. 3 contains a function code and an address where the instruction word directs the storage controller 36 to read day clock 34 and write the current value of day clock 34 into memory storage module 30 through bus 32 to the address specified within the instruction word. In the alternate mode, when the write day clock to memory command is provided to storage controller 36, storage controller 36 can store the address in address storage buffer 62 while reading the current day clock value from day clock 34.

Figure 6:
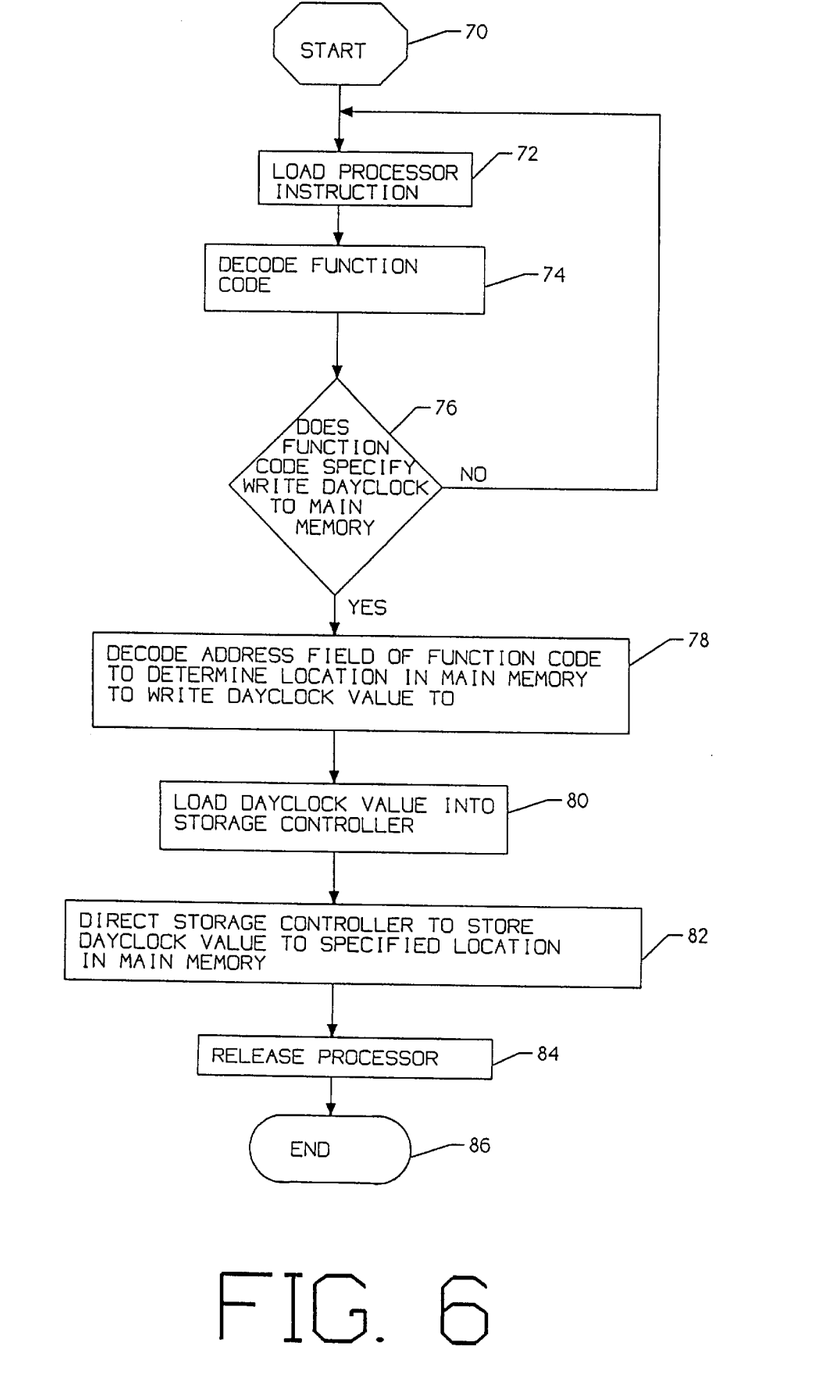
FIG. 6 is a flow diagram showing a preferred method of the present invention.

FIG. 6 is a flow diagram showing a preferred method of the present invention. Element 70 provides entry to the method of writing the current day clock value to a main memory storage location. Element 72 provides a requesting processor to load a processor instruction. Element 74 decodes the function code to determine the transaction type. Element 76 provides a decision as to whether or not the function code is specifying the write-day clock-to-memory command. If not, element 76 provides a return to element 72. If the function code is specifying the write-day clock-to-memory command, element 76 provides entry to element 78. Element 78 decodes the address field of the function code in order to determine the location in main memory to write the current day clock value to. Element 80 loads the day clock value into the storage controller. Element 82 directs the storage controller to store the day clock value to the address specified in element 78. Element 84 releases the processor. Element 86 provides an exit to the method of writing a current day clock value from the day clock element to a memory storage location.

Having thus described the preferred embodiments of the present invention, those of skill in the art will readily appreciate that the teachings found herein may be applied to yet other embodiments within the scope of the claims hereto attached.

We claim:

1. A method of storing a day clock value into a memory storage module with a single memory storage command in a system having a processor and a storage controller, the processor providing requests to the storage controller to access the memory storage module, the memory storage module having a plurality of memory storage locations, the method comprising the steps of:

a. executing the single memory storage command via the processor;

b. issuing a request from the processor to the storage controller to request that the storage controller read the day clock value from a day clock generator, and store the day clock value at a storage address in the memory storage module, the storage address being specified by the single memory storage command and being provided to the storage controller from the processor via the request, the storage address identifying at least one of the plurality of memory storage locations of the memory storage module;

c. reading the day clock value from the day clock generator into the storage controller;

d. selecting a particular one of the plurality of memory storage locations within the memory storage module by examining the storage address provided to the storage controller via the request from the processor; and e. storing the day clock value from the storage controller into the selected one of the plurality of memory storage locations.

2. A method according to claim 1 wherein the system includes a plurality of requesting processors coupled to the storage controller, the particular one of the plurality of memory storage locations is selected by a storage address provided by a particular one of the plurality of requesting processors.

3. A method according to claim 1 wherein the storage address is specified by an address field of the single memory storage command.

4. A method of storing a day clock value into a memory storage module with a single memory storage command in a system having a processor and a storage controller, the memory storage module having a plurality of memory storage locations, comprising the steps of:

a. reading the day clock value into the storage controller;

b. reading an address field of the single memory storage command to determine a particular one of the plurality of memory storage locations within the memory storage module; and c. storing the day clock value into said particular one of the plurality of memory storage locations from the storage controller.

5. A method of storing a day clock value into a memory storage module with a single memory storage command in a system having a processor and a storage controller, the memory storage module having a plurality of memory storage locations comprising the steps of:

a. providing a request from the processor to the storage controller requesting that the storage controller read the day clock value from a day clock generator;

b. selecting a particular one of the plurality of memory storage locations within the memory storage module; and c. storing the day clock value into said selected one of the plurality of memory storage locations.

6. A method according to claim 5 wherein the particular one of the plurality of memory storage locations is specified by an address field of the single memory storage command.

7. A method of storing a day clock value into a memory storage module with a single memory storage command in a system having a processor and a storage controller, the memory storage module having a plurality of memory storage locations comprising the steps of:

a. providing a request from the processor to the storage controller requesting that the storage controller read the day clock;

b. reading an address field of the single memory storage command to determine a particular one of the plurality of memory storage locations within the memory storage module; and c. storing the day clock value into said particular one of the plurality of memory storage locations.

8. An apparatus for storing a day clock value into a memory storage module with a single memory storage command in a system having a processor and a storage controller, the memory storage module having a plurality of memory storage locations, comprising:

a. requesting means coupled to the processor for providing a request from the processor to the storage controller requesting that the storage controller read the day clock value;

b. a day clock generator coupled to the storage controller for providing a day clock value;

c. reading means for reading the day clock value from said day clock generator into the storage controller when the request is received by the storage controller;

d. selecting means for selecting a particular one of the plurality of memory storage locations within the memory storage module; and e. storing means for storing the day clock value into said particular one of the plurality of memory storage locations.

9. An apparatus according to claim 8 wherein the system includes a plurality of requesting processors coupled to the storage controller, the particular one of the plurality of memory storage locations being selected by a particular one of a plurality of requesting processors.

10. An apparatus according to claim 8 wherein the particular one of the plurality of memory storage locations is specified by an address field of the single memory storage command.

11. An apparatus for storing a day clock value into a memory storage module with a single memory storage command in a system having a processor and a storage controller, the memory storage module having a plurality of memory storage locations comprising:

a. first reading means for reading the day clock value into the storage controller;

b. second reading means for reading an address field of the single memory storage command to determine a particular one of the plurality of memory storage locations within the memory storage module; and c. means for storing the day clock value into said particular one of the plurality of memory storage locations.

12. An apparatus for providing a request from a processor to a storage controller, wherein the request causes the storage controller to read a day clock value from a day clock generator and store a resulting day clock value into one of a number of memory storage locations in a memory storage module, comprising:

a. issuing means for issuing a request from the processor to the storage controller requesting that the storage controller read the day clock value from the day clock generator and store the resulting day clock value to a storage address in the memory storage module, the storage address being specified by the request, the storage address identifying at least one of the number of memory storage locations of the memory storage module;

b. reading means for reading the day clock value from the day clock generator into the storage controller;

c. selecting means for selecting a particular one of the number of memory storage locations within the memory storage module by examining the storage address provided to the storage controller via the request from the processor; and d. storing means for storing the day clock value into said particular one of the number of memory storage locations.

13. An apparatus according to claim 12 further including a plurality of requesting processors coupled to the storage controller, the particular one of the plurality of memory storage locations is selected by a particular one of a plurality of requesting processors.

14. An apparatus according to claim 12 wherein the particular one of the plurality of memory storage locations is specified by an address field of a single memory storage command executed by the processor.

15. An apparatus for requesting a storage controller to read a day clock generator and store a resulting day clock value into a memory storage module with a single memory storage command in a system having a plurality of memory storage locations for a data processing system comprising:

a. first reading means for reading the day clock value from the day clock generator;

b. second reading means for reading an address field of the single memory storage command to determine a particular one of the plurality of memory storage locations within the memory storage module; and c. storing means for storing the day clock value into said particular one of the plurality of memory storage locations.

16. In a data processing system having a day clock element wherein the day clock element provides a day clock value, the improvement comprising:

a. first reading means for reading the day clock value from the day clock element;

b. memory storage module having a plurality of memory storage locations;

c. processor means for executing a single memory storage command having an address field specifying a particular one of said plurality of memory storage locations that the day clock value is to be written;

d. second reading means for reading said address field of said single memory storage command to determine said particular one of said plurality of memory storage locations within said memory storage module to store said day clock value;

e. a storage controller responsively coupled to said memory storage module for storing the day clock value into said particular one of said plurality of memory storage locations;

f. a common I/O access module responsively coupled to said storage controller for arbitrating access to said storage controller; and g. said processor means responsively coupled to said common I/O access module for providing said address field of said single memory storage command to said storage controller.

* * * * *